(12) United States Patent
Cervantes

(10) Patent No.: US 6,795,887 B1
(45) Date of Patent: Sep. 21, 2004

(54) MODULAR MFP/PRINTER ARCHITECTURES

(75) Inventor: Jose L. Cervantes, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 542 days.

(21) Appl. No.: 09/800,012

(22) Filed: Mar. 5, 2001

(51) Int. Cl.[7] .......................... G06F 13/00; G06F 13/14
(52) U.S. Cl. .................. 710/316; 710/100; 710/305
(58) Field of Search .................. 710/72, 316, 317; 358/468, 474, 475, 476

(56) References Cited

U.S. PATENT DOCUMENTS

| | | | | |
|---|---|---|---|---|
| 5,717,957 A | * | 2/1998 | Lin ............................. | 710/72 |
| 6,064,490 A | * | 5/2000 | Minamizawa .............. | 358/1.14 |
| 6,108,306 A | * | 8/2000 | Kalkunte et al. .......... | 370/235 |
| 6,181,884 B1 | * | 1/2001 | Isogai et al. .............. | 399/1 |
| 6,192,400 B1 | * | 2/2001 | Hanson et al. ............ | 709/217 |
| 6,359,877 B1 | * | 3/2002 | Rathonyi et al. .......... | 370/349 |
| 6,388,776 B1 | * | 5/2002 | Kim ........................... | 358/475 |
| 6,487,611 B1 | * | 11/2002 | Brusky et al. .............. | 710/10 |
| 6,563,598 B1 | * | 5/2003 | Johnson et al. ............ | 358/1.15 |
| 6,646,765 B1 | * | 11/2003 | Barker et al. .............. | 358/474 |

* cited by examiner

Primary Examiner—Tim Vo

(57) ABSTRACT

Modularized intra-system architectures for printer and multifunction peripheral (MFP) devices are based on disintegrating traditionally highly integrated systems into separate system components which incorporate immerging packet-switched interconnect technologies, such as the open standard RapidIO™. An MFP device has an internal modular architecture which includes each of the main systems integrated onto separate ASIC chips. The systems are interconnected through a switch fabric which routes packet-based data between the systems based on destination addresses embedded in the packets. The packet-based data is routed between the switch fabric and each of the systems through switch IO buses which provide a dedicated, point-to-point connection between the switch fabric and each system. The modular MFP/printer architectures using packet-switched interconnect technology have lower transaction latency, higher bandwidth, and fewer pins per system than is possible using traditional shared multi-drop bus architectures, and achieve data transfer rates in the gigabyte per second range.

33 Claims, 9 Drawing Sheets

MODULAR MFP/PRINTER ARCHITECTURES

TECHNICAL FIELD

The present invention relates to the intra-system architecture of peripheral devices and multifunction peripheral devices and, more particularly, to the modularization of such architecture to take advantage of packet-switched interconnect technology.

BACKGROUND

The intra-system architectures of peripheral devices such as printers, scanners, copiers, and fax machines, or multifunction peripheral (MFP) devices which combine two or more peripheral devices into a single device, have conventionally been designed with an emphasis toward the integration of functions or systems. Thus, an MFP device having both printing and scanning capabilities typically includes as part of its intra-system architecture, an application specific integrated circuit (ASIC) which is designed to perform the functions of both the printer system and the scanner system. In addition to the printer and scanner systems, other systems such as the input-output (1I) system and a processor core may also be integrated into the single ASIC chip.

Several factors have traditionally encouraged the use of highly integrated ASICs in MFP and printer architectures. One such factor is cost. By integrating many systems or circuits onto a single ASIC chip, various pins are shared among systems which reduces the overall pin-count required to implement all of the systems, thereby reducing the cost. Furthermore, as higher volumes of a particular ASIC are produced and used in a product, the cost for each ASIC drops, thereby reducing the overall product cost.

Another factor that has encouraged the use of more highly integrated ASICs in MFP and printer architectures is interconnect technology performance. The chip-to-chip and backplane interconnect technology traditionally used in MFP and printer architectures has been the PCI (peripheral component interface) bus. PCI bus architectures typically have a hierarchy of shared multi-drop buses which rely on address broadcasting to alert target systems of a transaction, thus limiting communications over the bus to one system at a time. System components are plugged into the bus according to their required performance levels, with low performance systems being plugged into lower performance buses that are bridged to higher performance buses so as to not burden higher performance systems.

Shared multi-drop buses have recently begun to reach their full performance potential, and techniques such as increasing bus frequency and widening the bus interface have been applied to gain higher levels of bus throughput. As bus frequency and width increase however, the ability to have more than a few systems attached to a shared bus becomes a difficult design challenge due to the corresponding need to reduce the number of electrical loads (e.g., systems) on a single bus. This challenge has in turn encouraged a higher level of system integration onto ASIC chips. Therefore, both product cost and the state of system interconnect technology have tended to support the use of more highly integrated ASICs in MFP and printer architectures.

Unfortunately, there can be significant disadvantages to using more highly integrated ASICs in the design of printer and MFP devices. Generally, ASICs that are highly integrated require higher development costs when they are newly designed or redesigned, are not leveragable across products, and increase the time to market for new products. These disadvantages are more pronounced in a market environment increasingly driven by rapid technological innovation. Time to market for a new peripheral device is key to its success, and rapid technological innovation drives the need to quickly release new products to the market in order to capture the benefits of new technology. In such an environment, highly integrated ASICs, limited to use in specific peripheral products, create a significant bottleneck in the development of newly designed peripheral devices.

For example, an MFP device having printer and scanner functions may be redesigned to integrate a fax function as well. This change would seemingly only require the effort of integrating a fax system onto a prior ASIC which already includes a printer and scanner system. However, each time an ASIC is redesigned to alter one of its integrated systems or to add a new system, every system on the ASIC must be reverified to ensure that a bug or architectural flaw has not been introduced in the process. This process is costly, since ASIC development involves the separate work of hardware and software engineers, with the software engineers having to wait for the first silicon to become available from an ASIC design before implementing code to test and verify the different systems integrated onto the ASIC. Therefore, the need to quickly turn new technology into a peripheral product and release it to market is very difficult to meet when highly integrated ASICs, limited to use in specific peripheral products, are being used in new peripheral product designs.

Finally, the use of highly integrated ASICs in intra-system architectures does not exploit the potential advantages that immerging packet-switched interconnect technologies can provide. In general, systems in peripheral devices such as printers, scanners, and fax machines are increasingly required to handle higher volumes of information as colors are used, resolutions are increased, more electronic equipment is digitalized, and general networking environments progress. For example, a printer was once the output device connected to a host computer. Today, a printer can directly output data from a scanner and digital camera without using a host computer.

Therefore, to support the higher performance demands of peripheral devices, system interconnect buses must carry much higher volumes of information. However, conventional shared multi-drop PCI bus technologies have begun to reach their full potential over the past number of years, as mentioned above, and new, high performance packet-switched interconnect technology is available. Packet-switched interconnect technology allows point-to-point, moderately parallel interconnects through a switch fabric that permits a flattened (rather than hierarchical) architecture that uses fewer interface pins while providing greater transmission distance, lower transaction latency, and higher bandwidth.

Thus, where performance limited PCI hierarchical shared bus architectures benefit from the use of highly integrated ASICs, the enhanced performance and reduced pin count per interface available with packet-switched interconnect technology diminishes the need for highly integrated system architectures.

SUMMARY

Modularized intra-system architectures for printer and multifunction peripheral (MFP) devices are based on disintegrating traditionally highly integrated systems into separate system components which incorporate immerging packet-switched interconnect technologies. Where the performance levels of conventional shared multi-drop bus architectures using more highly integrated systems have peaked, the modularized MFP/printer architectures utilizing packet-switched interconnect technology significantly increase the performance of peripheral devices while providing the benefits of reduced costs and quicker time to market for newly designed peripheral products.

In a specific implementation, an MFP device has an internal modular architecture which includes each of the main systems integrated onto separate ASIC (application specific integrated circuit) chips. Thus, a printer system, a scanner system, an input/output (IO) system, and a processor are each integrated onto separate ASIC chips. The systems are interconnected through a switch fabric which routes packet-based data between the systems based on destination addresses embedded in the packets. The packet-based data is routed between the switch fabric and each of the systems through switch IO buses which provide a dedicated, point-to-point connection between the switch fabric and each system.

In another implementation, the intra-system architecture of a printer device is similarly modularized to include its main functional systems each integrated onto separate ASIC chips. The printer system, an IO system, and a processor system are each integrated onto separate ASIC chips. The systems are coupled to one another through a switch fabric which routes packet-based data between the systems through switch 10 buses as described above.

An example of a packet-switched interconnect technology suitable for use with the modularized MFP/printer architectures described herein is the open standard RapidIO™. RapidIO™ is being developed and promoted as an open standard by the RapidIO™ Trade Association. Other packet-switched interconnect technologies may also be suitable, such as the proprietary standard, Lightning Data Transport (LDT) being developed by Advanced Micro Devices.

The modular MFP/printer intra-system architectures using packet-switched interconnect technology are capable of data transfer rates in the gigabyte per second range. This is a significant performance advantage over prior MFP/printer architectures using conventional shared multi-drop buses, such as PCI (peripheral component interface), which have data transfer rates limited to a few megabytes per second. The modularized packet-switched architectures have lower transaction latency, higher bandwidth, and fewer pins per system than is possible using a shared bus architecture. Peripheral system functions in MFP and single peripheral/printer devices are implemented through separate ASIC systems which communicate through packet-based transactions and are connected through packet-switched interconnects that provide dedicated, point-to-point, and moderately parallel data paths.

Implementing peripheral functions through individual system ASICs has additional advantages in the production of MFP, peripheral, and printer devices. For example, the individual system ASICs are available for use across multiple product lines, rather than being limited to use in a specific peripheral product as is the case with highly integrated ASIC systems. In addition, minor design changes need only affect specific systems rather than requiring the redevelopment and reverification of an entire highly integrated ASIC.

BRIEF DESCRIPTION OF THE DRAWINGS

The same reference numbers are used throughout the drawings to reference like components and features.

DETAILED DESCRIPTION

The modular MFP (multifunction peripheral) and printer architectures described herein relate to intra-system interconnections between integrated circuit chips, such as ASICs (application specific integrated circuits), and the PCBs (printed circuit boards) which these chips populate. The modular architectures utilize packet-switched interconnect technology to achieve chip to chip and board to board data transfer rates in the gigabyte per second range. In addition to improving the performance of new and existing MFP and printer platforms, the partitioning of functions intrinsic to the modularized architectures permits the application of functional systems across numerous product lines, which in turn results in reduced costs for MFP and printer products.

Part of the cost reduction relates to the economies of scale which result from being able to use modular ASIC systems in numerous products, as opposed to relying on highly integrated ASIC systems which are confined to use in a single product. Additional benefits include reduced engineering costs and faster time to market for newly designed MFP and printer products. Developing and testing a single system on a modularized ASIC for a new product design, as opposed to redeveloping and retesting every system on a highly integrated ASIC, requires fewer engineering resources and allows new MFP and printer technology to hit the market faster.

Exemplary Environment for Modular Architectures

Figure 1:
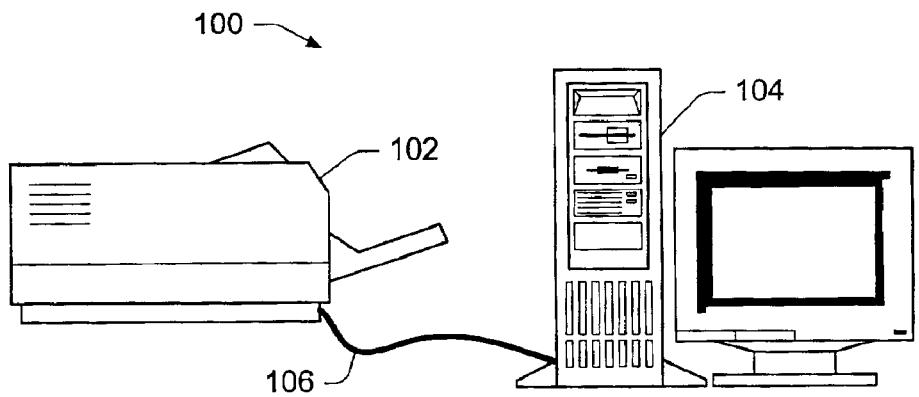
FIG. 1 illustrates a workstation and a peripheral device as a suitable system environment in which to implement modular MFP and peripheral/printer architectures.

FIG. 1 illustrates an example of an environment which is suitable for implementing modular MFP and printer architectures as described herein. The system 100 of FIG. 1 includes a peripheral device 102 connected to a host computer 104 through a direct or network connection 106. Network connections 106 can include LANs (local access networks), WANs (wide area networks), or any other suitable communication link. The peripheral device 102 may be a printer, a scanner, a copier, a fax machine, or other such device, or may also be a multifunction peripheral (MFP) device which combines the functionality of two or more peripheral devices into a single device.

The host computer 104 outputs host data to the peripheral device 102 in a driver format suitable for the device 102, such as PCL or postscript for a printer device 102. The peripheral device 102 converts the host data and outputs it onto an appropriate recording media.

Figure 2:
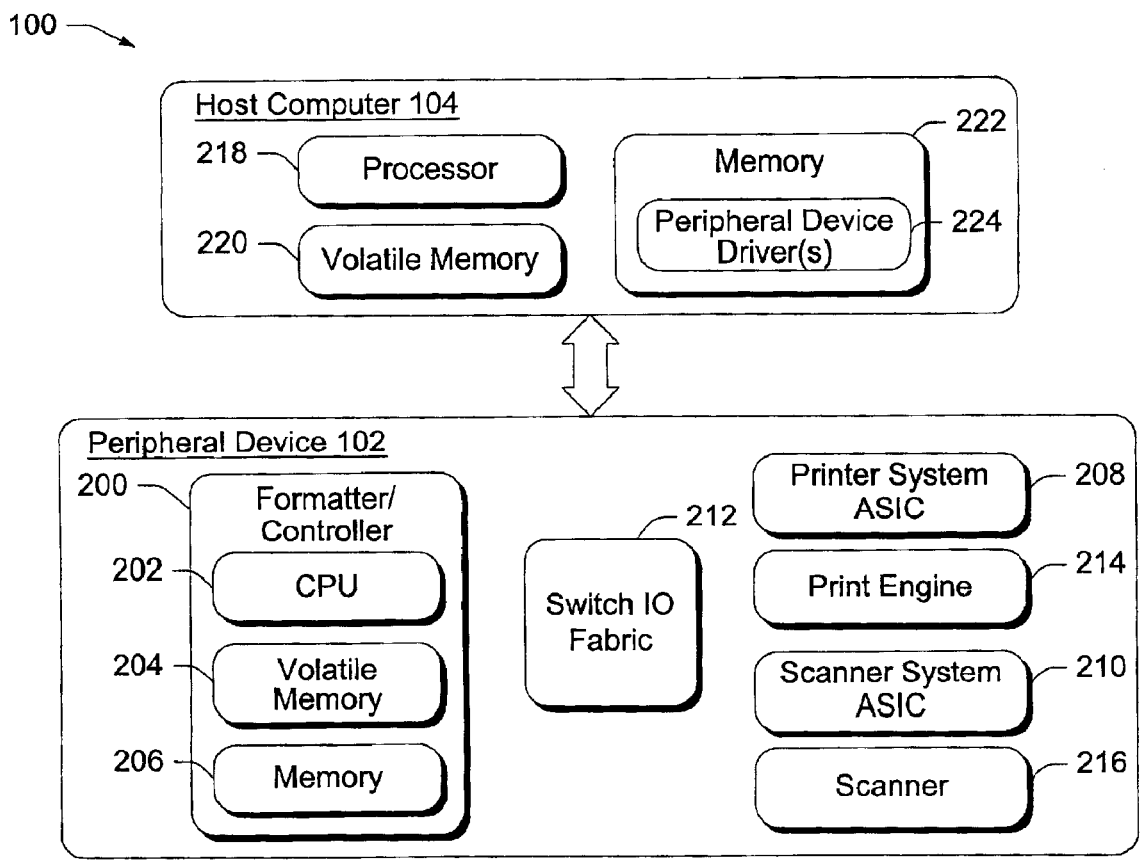
FIG. 2 is a block diagram illustrating a system such as that in FIG. 1.

FIG. 2 illustrates an example of system 100 in more detail. The peripheral device 102 has a formatter/controller 200 that processes the host data. The formatter/controller 200 typically includes a data processing unit or CPU 202, a volatile memory 204 (i.e., RAM), and a non-volatile memory 206 (e.g., ROM, Flash). The example peripheral device 102 of FIG. 2 is an MFP device including both a printer system 208 and a scanner system 210. In general however, the peripheral device 102 may include just a single system such as the printer system 208, or may include systems in addition to the printer system 208 and scanner system 210. Each system is preferably implemented as a distinct ASIC which communicates through the switch IO fabric 212, as discussed below with reference to subsequent FIGS. 3–9. In the configuration of FIG. 2, the printer system 208 and scanner system 210 use the same formatter/controller 200 which processes the host data as appropriate for output to the print engine 214, or, it processes the data from the scanner 216 for output back to the print engine 214 as when making a copy, or back to the host 104 when scanning back to the host.

The host computer 104 includes a processor 218, a volatile memory 220 (i.e., RAM), and a non-volatile memory 222 (e.g., ROM, hard disk, floppy disk, CD-ROM, etc.). The host computer 104 may be implemented, for example, as a general-purpose computer, such as a desktop personal computer, a laptop, a server, and the like. The host computer 104 implements one or more software-based peripheral drivers 224 that are stored in non-volatile memory 222 and executed on the processor 218. The peripheral driver(s) 224 configure data into an appropriate format (e.g., PCL, postscript, etc.) and output the formatted data to the peripheral device 102.

Exemplary Packet-Switched Interconnect Technology

Various packet-switched interconnect technologies that are now available or currently being developed, such as RapidIO™ and Lightning Data Transport (LDT), may be suitable for use with the modular intra-system architectures described throughout this disclosure. LDT is a proprietary standard being developed by Advanced Micro Devices. RapidIO™ is an open standard being developed and promoted by the RapidIO™ Trade Association. Although RapidIO™ is referenced throughout this disclosure in portraying the modular intra-system architectures, other similar interconnect technologies may be appropriately used.

RapidIO™ is a low pin count, packet-switched, intra-system interconnect that furnishes a switch fabric to attach a distributed network protocol management subsystem. In general, switch fabric or switch IO fabric, as used throughout this disclosure in the summary, detailed description, and claims, is an interconnect that includes a processor, memory, and memory mapped IO interface optimized for use inside a chassis. The processor circuitry and its programming control the switching paths of the fabric. Data transactions between systems coupled to the switch fabric are based on packets, with each packet having a source specified destination address which instructs the switch fabric where the packet is to be routed. This method of source routing burdens only the path between the sending and receiving system with each transaction, leaving open bandwidth on other paths and enabling concurrent communications between additional systems.

Control symbols within packets manage the flow of transactions through the switch fabric and between the various systems. Control symbols are used for packet acknowledgement, flow control information, and maintenance functions. Maintenance functions involve tasks such as error detection and recovery. Flow control permits various systems to communicate through the switch fabric concurrently, rather than systems having to take turns communicating over a bus as occurs with traditional shared multi-drop bus architectures.

RapidIO™ is specified in a 3-layer hierarchy of logical, transport, and physical specifications. The logical specification defines the overall protocol and packet formats necessary for endpoint systems to process a data transaction. The transport specification provides the necessary route information for a packet to move from one system to another. The physical specification contains the system level interface such as packet transport mechanisms, flow control, electrical characteristics, and low level error management. RapidIO™ can be understood in greater detail with reference to the RapidIO™ specification. The RapidIO™ specification can be obtained through the RapidIO™ Trade Association and is expressly incorporated herein by reference.

Exemplary Modular MFP and Printer Architectures

Figure 3A:
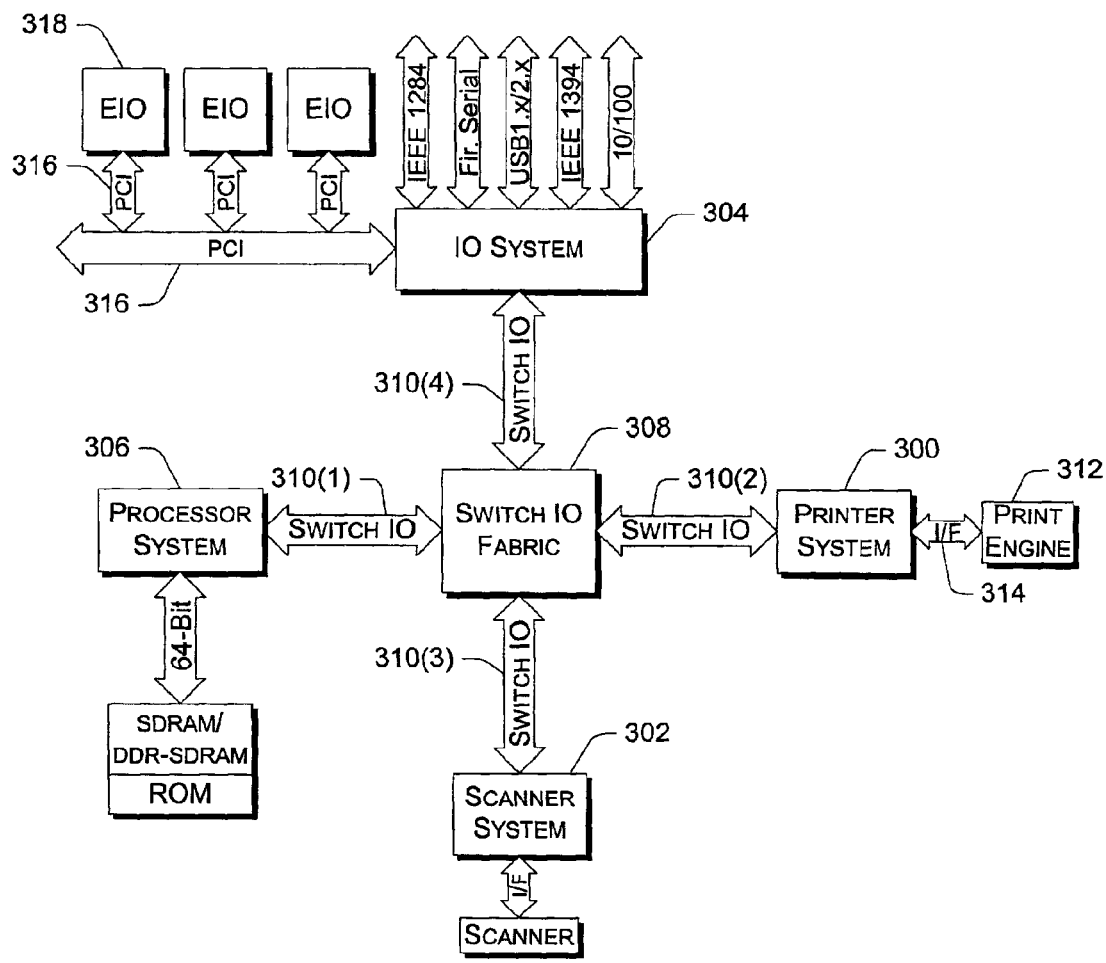
FIG. 3A illustrates a modular intra-system architecture for an MFP device.

FIG. 3A illustrates a modular intra-system architecture for an MFP device which has both printer and scanner capabilities. The modular architecture includes a separate ASIC chip for each of the main MFP systems. Thus, the printer system 300, the scanner system 302, the IO (input/output) system 304, and the processor system 306 are each separately integrated onto distinct ASICs. Each ASIC system incorporates packet-switched technology, and the intra-system architecture includes a switch IO fabric 308 and switch IO buses 310 interconnecting each system for the purpose of transferring data. The switch IO buses 310 connecting each system to the switch IO fabric 308 provide dedicated (i.e., non-shared), point-to-point interconnects.

Figure 8:
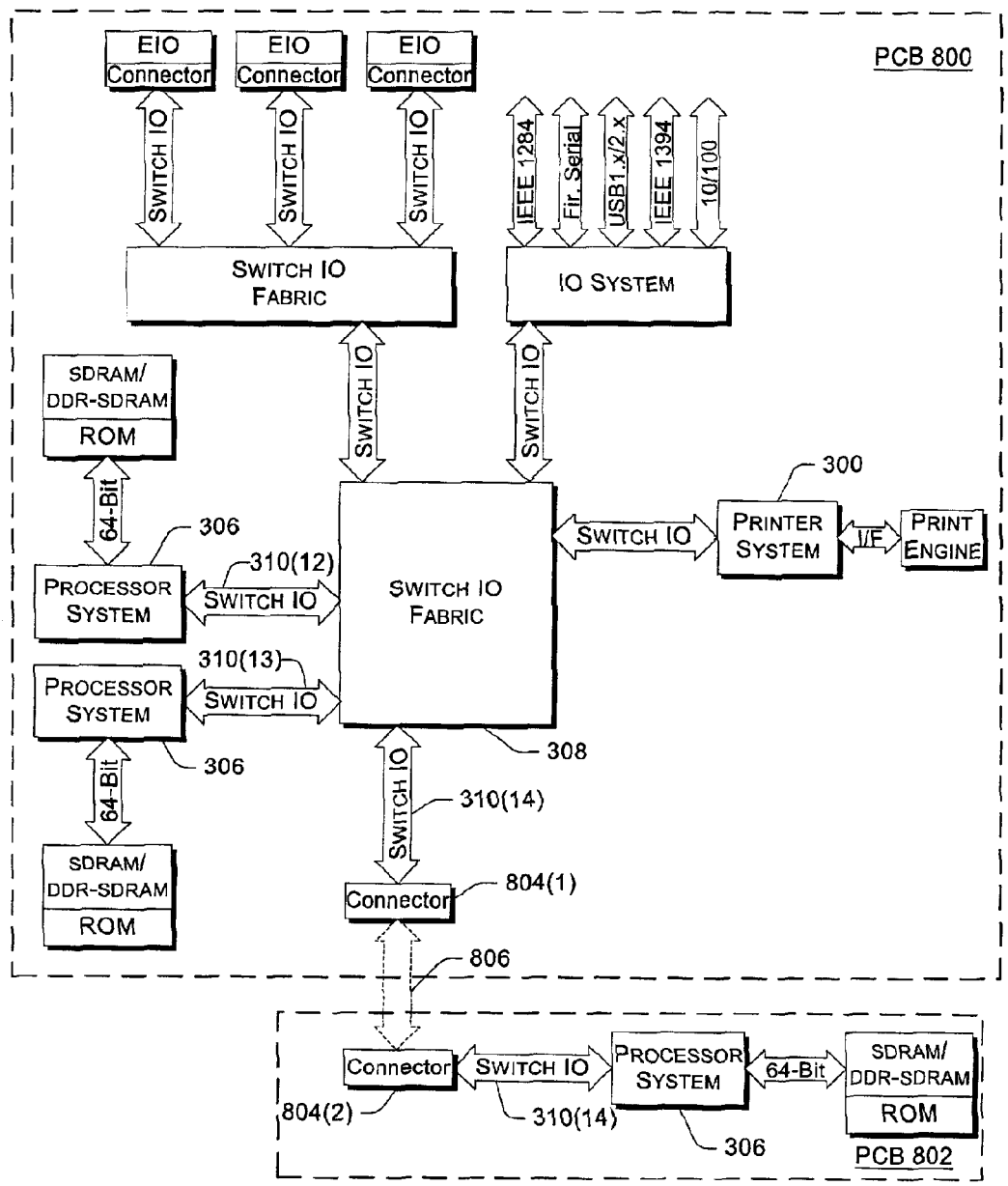
FIG. 8 illustrates a modular intra-system architecture for a single printer device having multiple processors.

Although the MFP device of FIG. 3A includes only printer and scanner functions, additional peripheral functions can also be included, such as facsimile and copy functions. The modular intra-system architecture permits the addition of functions by interconnecting their respective systems to the switch IO fabric 308 through additional dedicated switch IO buses 310. In addition, multi-processor systems can be easily configured by interconnecting additional processors to the switch IO fabric 308 through switch IO buses 310. A multi-processor system is illustrated in FIG. 8.

Each system in the MFP architecture of FIG. 3A is a separate module designed to perform its specific system functions and to interact within the modularized intra-system architecture using packet-switched interconnect technology. Therefore, inherent to the design of each modular ASIC system, is the packet-switched interconnect technology being used in the intra-system architecture, such as RapidIO™. Thus, in addition to performing typical functions such as pipelining images and controlling the print engine, the printer system 300 is designed to operate within the modularized architecture where data transactions are based on the RapidIO™ packet-switched technology. Details of the RapidIO™ packet-switched technology which are necessarily integrated into each modular ASIC system can be found in the RapidIO™ specification, incorporated by reference above.

Figure 3B:
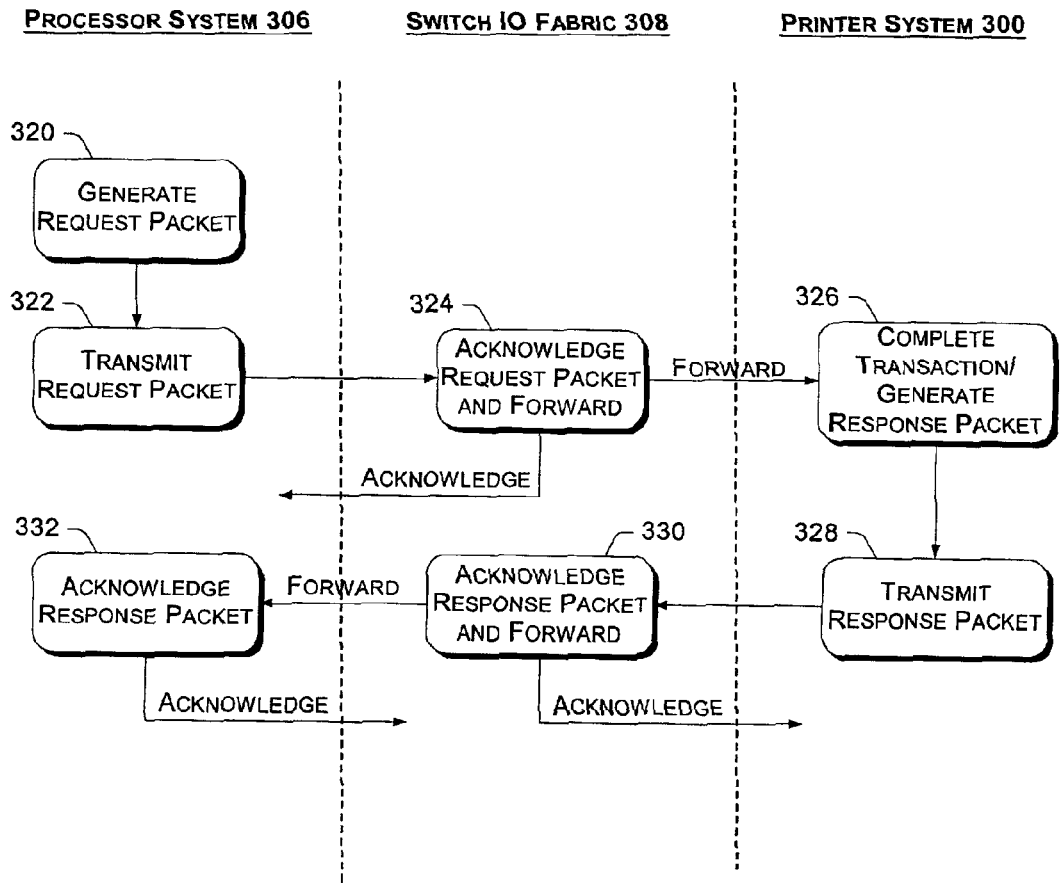
FIG. 3B is a flow diagram illustrating an example transaction within the modular intra-system architecture for the MFP device of FIG. 3A.

An example transaction within the MFP architecture of FIG. 3A is illustrated by the flow diagram of FIG. 3B. An initiating system, such as the processor system 306, generates a request packet at operation 320, which is transmitted to a target system, such as the printer system 300. First, the packet is sent from the processor system 306 to the switch IO fabric 308 at operation 322, through the dedicated switch IO bus 310(1). The switch IO fabric 308 replies with an acknowledge control symbol at operation 324, which it sends back to the processor system 306 through switch IO bus 310(1). The switch 10 fabric 308 also forwards the request packet on to the target printer system 300 through switch IO bus 310(2). The printer system 300 completes the transaction and generates a response packet at operation 326. The response packet is then sent through the switch 10 bus 310(2) to the switch IO fabric 308 at operation 328, and on to the processor system 306 through switch IO bus 310(1) at operation 330, using control symbols to acknowledge each transfer. When the response packet reaches the initiating processor system 306 and is acknowledged at operation 332, the transaction is complete.

While such transactions take place between the processor 306 and printer 300 systems, additional transactions may occur simultaneously between other systems. For example, while the transaction between the processor system 306 and the printer system 300 is taking place, a similar transaction may be taking place between the scanner system 302 and the IO system 304. In general, data transactions occur in a similar fashion within each of the subsequently described modular architectures of FIGS. 4–9.

Although various advantages of the modularized architectures have been briefly mentioned, having introduced an exemplary intra-system architecture in FIG. 3A, particular advantages associated with the use of modular ASIC systems as opposed to highly integrated ASIC systems are more readily apparent. For example, a minor advance in print engine technology may cause a change in the print engine 312 of FIG. 3A. This change may alter the interface 314 to the print engine 312 which in turn requires a minor at redesign of the printer system 300. In a traditional PCI bus architecture where a highly integrated ASIC might include all the main peripheral systems (i.e., the printer system 300, the scanner system 302, the IO system 304, and the processor system 306), a minor in redesign of the printer system 300 would require redeveloping and reverifying each system on the ASIC. In the modularized architecture illustrated in FIG. 3A, however, the minor redesign of the printer system 300 only requires redeveloping and reverifying the single printer system 300 ASIC. Thus, the length of development cycles and the associated engineering costs for new products are significantly reduced.

Figure 4:
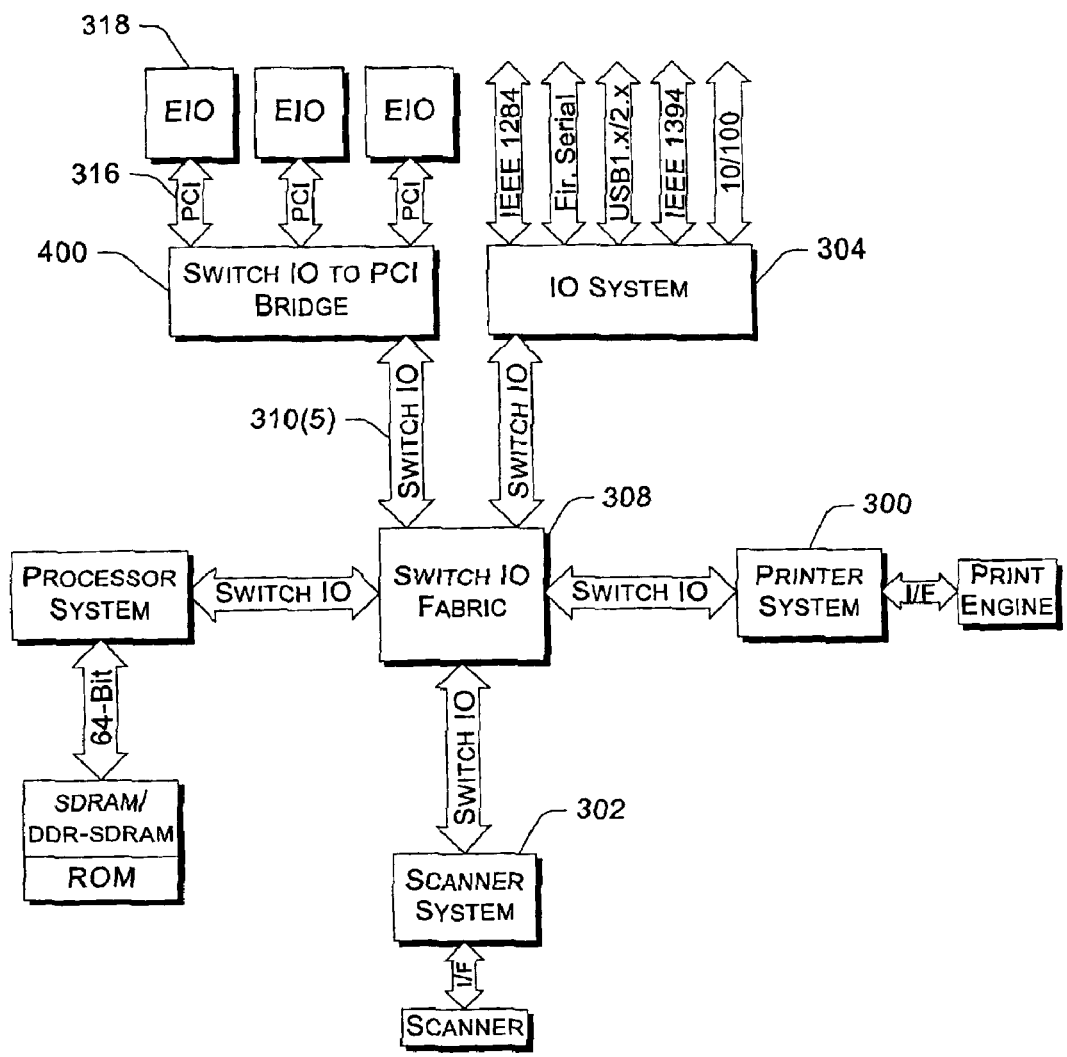
FIG. 4 illustrates a further modularization of the intra-system architecture within the MFP device of FIG. 3.

FIG. 4 illustrates a further modularization of the intra-system architecture within the MFP device represented by FIG. 3A. In FIG. 4, the IO system ASIC 304 has been separated from the PCI bus 316. The PCI bus 316 connects EIO (enhanced input/output) ports 318 to the intra-system architectures in both FIGS. 3A and 4. Generally, EIO ports 318 permit additional IO devices, such as hard drives, network cards, or other third party functions, to be connected to printers and other peripheral devices. In FIG. 3A, the PCI bus 316 and EIO ports 318 are connected to the intra-system architecture through the IO system ASIC 304, while in FIG. 4 they are connected through a bridge 400. The bridge 400 connects the PCI bus 316 and EIO ports 318 directly to the switch IO fabric 308 through an additional switch IO bus 310(5). The bridge 400 essentially permits data transactions to move between the packet-based architecture and the PCI bus architecture.

The benefit of the further modularization demonstrated by the architecture of FIG. 4 is similar to that discussed above with respect to the architecture of FIG. 3A. That is, the further modularization of the IO system ASIC 304 illustrated in FIG. 4 provides the added benefit of not having to reverify the PCI block 316 in the event that the IO system ASIC 304 is changed. For example, if a new IO standard is adopted, new printer/peripheral designs would be necessary to enable connection using the new standard. Such a change would require a change to the IO system ASIC 304. Under these circumstances, the architecture of FIG. 3A requires that the IO system ASIC 304 a along with the entire PCI block 316 be reverified. By contrast, the further modularized architecture of FIG. 4 avoids the reverification of the PCI block 316, because it is no longer affected by changes to the IO system ASIC 304.

Figure 5:
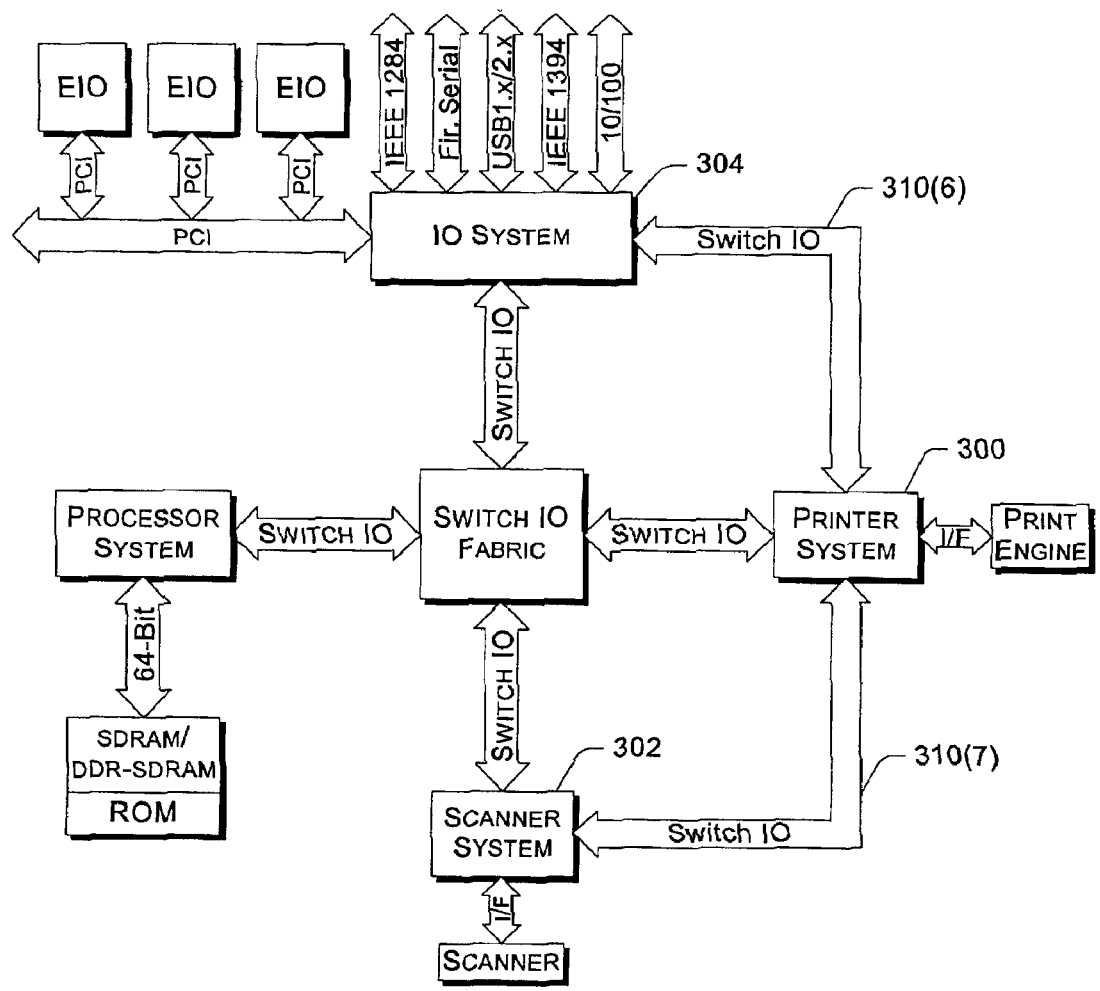
FIG. 5 illustrates a modular intra-system architecture for an MFP device similar to that shown in FIG. 3 including switch IO bus interconnects directly coupling ASIC systems.

FIG. 5 illustrates a modular intra-system architecture for an MFP device similar to that shown in FIG. 3A. However, the architecture of FIG. 5 includes additional high speed, switch IO bus 310 interconnects placed directly between ASIC, systems. Specifically, a dedicated point-to-point switch IO bus 310(6) couples the printer system ASIC 300 directly to the IO system ASIC 304, and another switch IO bus 310(7) couples the printer system ASIC 300 directly to the scanner system ASIC 302.

These additional bus interconnects are possible because of the reduced number of pins generally required to implement the modular architectures illustrated in FIGS. 3A and 5. Since the interface between a switch IO bus 310 and a modular system ASIC requires significantly fewer pins than are necessary for similar interfaces in a traditional PCI bus architecture, there are free pins available on the modular system ASICs which can be used for additional bus interfaces.

The additional switch IO bus 310(6–7) interconnects between systems illustrated in the modular architecture of FIG. 5 offer added performance benefits over the modular architecture of FIG. 3A. Although the switch IO fabric 308 provides data throughput rates significantly greater than traditional shared multi-drop PCI bus architectures, there is some transaction latency introduced by the switch IO fabric 308. Thus, where the switch IO fabric 308 can be avoided in data transactions, performance is further improved by eliminating the delay introduced going back and forth through the switch IO fabric 308.

The architecture of FIG. 5 therefore illustrates a direct, high speed, switch IO bus 310(6) interconnect between the printer system ASIC 300 and the IO system ASIC 304 which improves communication between these systems and is available by virtue of the reduction in pin count achieved through a modularized intra-system architecture. A similar switch IO bus 310(7) interconnect is shown between the printer system ASIC 300 and the scanner system ASIC 302. Additionally, the architecture illustrated in FIG. 5 is not meant to limit the number or configuration of these system to system interconnects. That is, such direct interconnects can exist between other systems wherever pin space is available and data transactions are appropriate.

Figure 6:
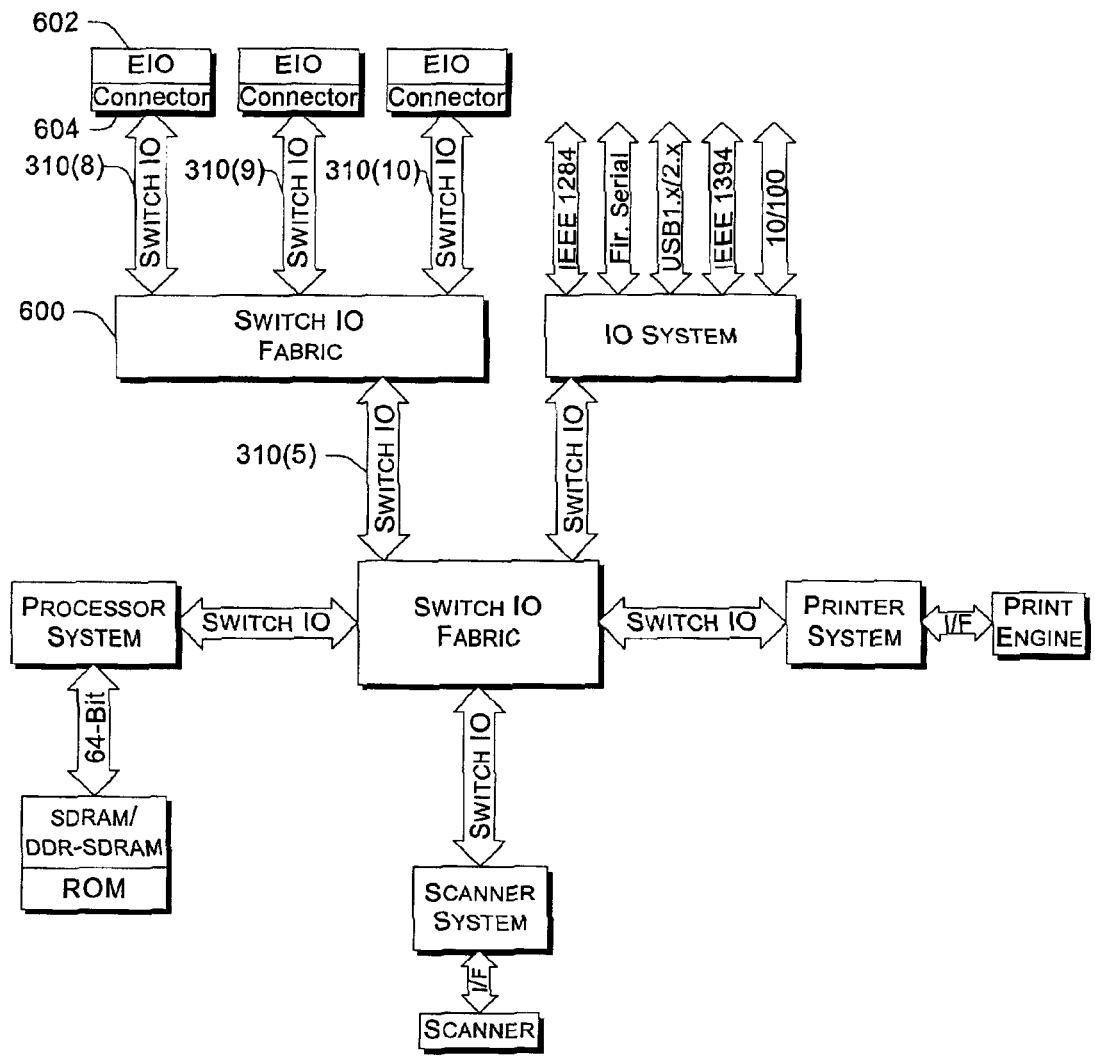
FIG. 6 illustrates a modular intra-system architecture for an MFP device similar to that shown in FIG. 4 where a bridge has been replaced with a second switch IO fabric.

FIG. 6 illustrates a modular intra-system architecture for an MFP device similar to that shown in FIG. 4. However, in the modular architecture of FIG. 6, the PCI bus 316 has been eliminated, and the switch IO to PCI bridge 400 has been replaced with a second switch IO fabric 600. In addition, EIO devices 602 are plugged into connectors 604 that are coupled to the second switch IO fabric 600 through additional switch IO bus 310(8–10) interconnects.

The second switch IO fabric 600 electrically isolates the EIO devices 602 from one another. Thus, the architecture in FIG. 6 permits the installation and removal of EIO devices 602 via connectors 604 without having adverse electrical impact on the transmission of data. By contrast, the intra-system architecture shown in FIG. 4, which utilizes a PCI bus to interconnect with EIO ports 318, does not provide the same electrical isolation. When EIO devices are added or removed from the EIO ports 318 of FIG. 4, the electrical load can change on the PCI bus 316 which may alter the amplitude of data signals and result in incorrect data transmissions. In general, the modular architecture of FIG. 6 illustrates the benefit of electrical isolation provided by the switch IO fabric which is important where systems or devices are installed and removed by hand.

Figure 7:
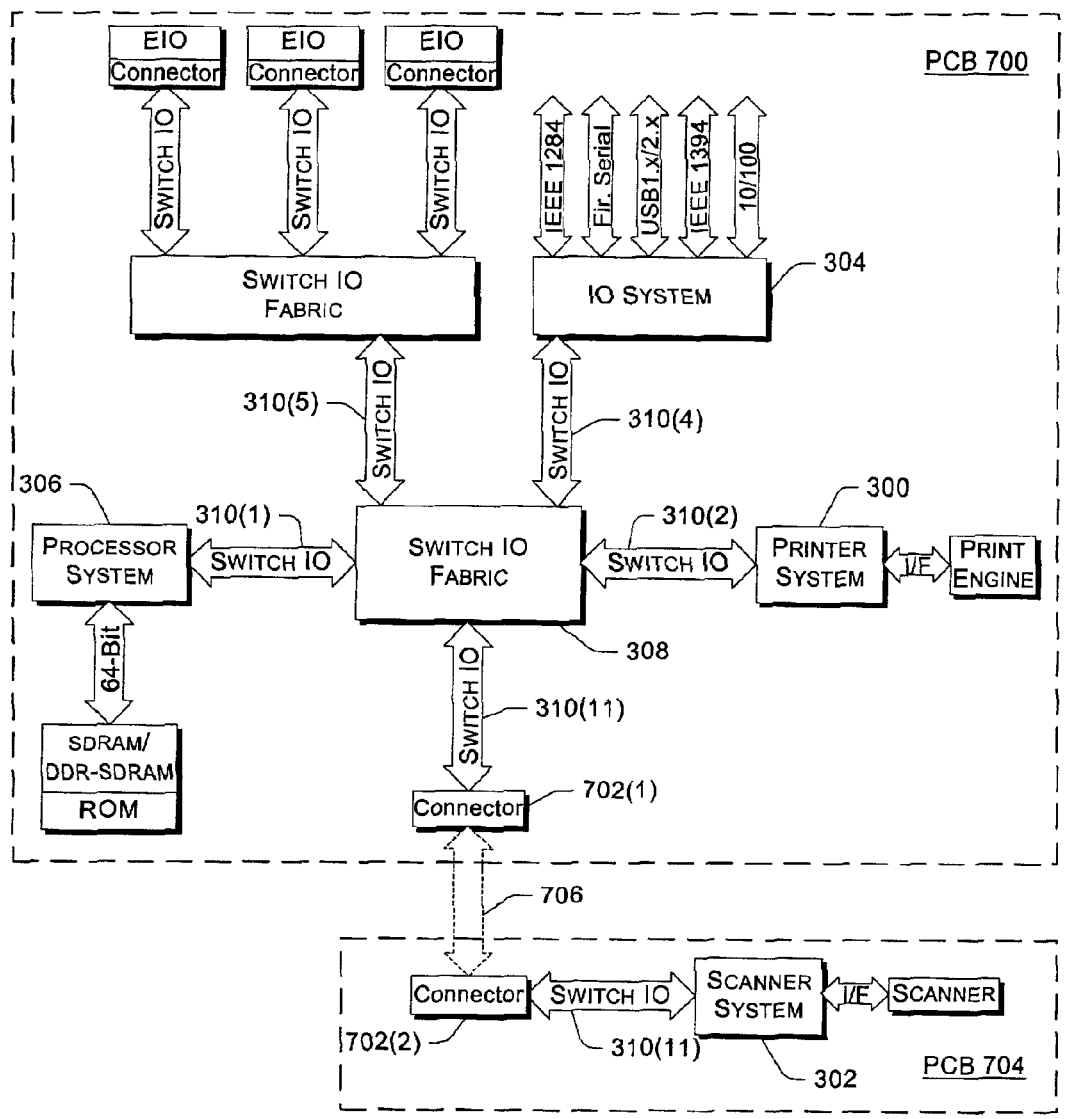
FIG. 7 illustrates a modular intra-system architecture for a single printer device.

FIG. 7, in one respect, illustrates a modular intra-system architecture for a single printer device represented on PCB 700. The PCB 700 for the printer architecture therefore includes the printer system 300, the IO system 304, and the processor system 306 each separately integrated onto distinct ASICs, without any additional peripheral device system ASICs connected to the switch IO fabric 308. The intra-system interconnects made through the switch IO fabric 308 and switch IO buses 310 are similar to those described above with respect to the various MFP device architectures.

In addition, the architecture shown on the PCB 700 of FIG. 7 is not limited to representing a single printer device, but might also represent other singular, as opposed to multifunction, peripheral device architectures. That is, the modular intra-system architectures described herein are applicable to single peripheral devices such as printers, scanners, facsimiles, and copiers, in addition to being applicable to MFP devices which combine two or more peripheral devices.

In a second respect, FIG. 7 illustrates that the format control of the printer platform on PCB 700 can be easily shared by other peripheral systems not resident on the same PCB 700. This is possible because the switch-based interconnects used in the modular architecture can traverse connectors. Thus, the switch IO bus 310(11) traverses the connector set 702, permitting interconnection between the printer platform PCB 700 and the scanner platform PCB 704. The connector set 702 intersection is represented by the hashed arrow 706 between PCB 700 and PCB 704.

FIG. 8 illustrates a modular intra-system architecture for a single printer device having multiple processors 306. The modular intra-system architecture permits the addition of processors by interconnecting them to the switch IO fabric 308 through additional switch IO buses 310(12–13) as shown by the two processors 306 on PCB 800 of FIG. 8. In addition, a processor system on a separate PCB 802 can be added to the architecture of PCB 800 through a switch IO bus 310(14) traversing a connector set 804. The connector set 804 intersection is represented by the hashed arrow 806 between PCB 800 and PCB 802.

Although the modular multi-processor architecture shown in FIG. 8 is embodied in a single printer device, it is not limited to this embodiment. That is, the modular multi-processor architecture shown in FIG. 8 is equally applicable to other single peripheral devices such as scanners, facsimiles, and copiers, as well as MFP devices which combine two or more peripheral devices.

Figure 9:
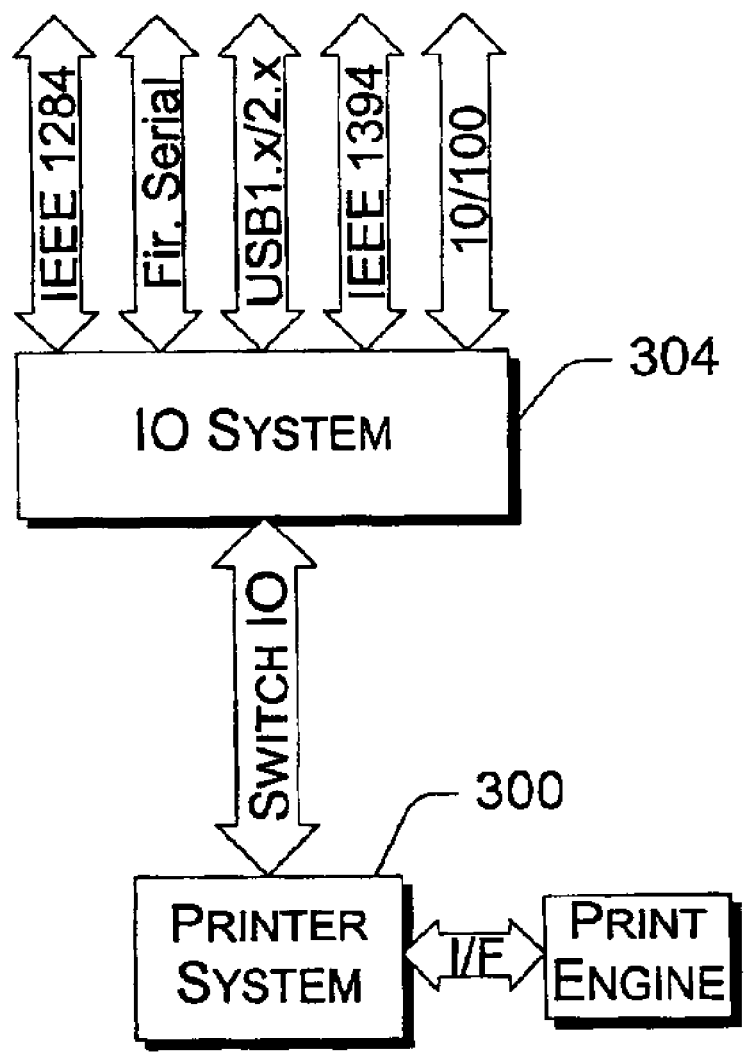
FIG. 9 illustrates a modular intra-system architecture for an inkjet printer having no processors.

FIG. 9 illustrates a modular intra-system architecture for a single inkjet printer device which has no processor. Inkjet printer platforms typically do not format printer driver output, such as PCL or postscript languages. Instead, this processing is done on the host computer, which sends pre-formatted data to the inkjet printer system.

For inkjet printers, or other peripheral devices which do not require an on-board processor, the modularized printer (or peripheral) system ASIC 300 can be directly interfaced to the IO system ASIC 304. The high speed performance benefits are therefore derived from the packet-based data transmission technology, in addition to the ability to use the printer (or peripheral) system ASIC 300 and the IO system ASIC 304 across different product lines.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A multifunction peripheral device comprising:
   a printer system;
   a scanner system;
   an input/output (IO) system;
   a processor system; and,
   a switch fabric for routing packet-based data between the printer systems the scanner system, the IO system, and the processor system trough switch IO buses, the switch IO buses providing a point-to-point dedicated interconnection between the switch fabric and each of the printer system, the scanner system, the IO system, and the processor system.

2. A multifunction peripheral device as recited in claim 1, wherein each system is integrated onto a distinct application specific integrated circuit (ASIC).

3. A multifunction peripheral device as recited in claim 1, further comprising a switch IO bus providing a point-to-point dedicated interconnection between the printer system and the scanner system which permits the transfer of packet-based data directly between the printer system and the scanner system.

4. A multifunction peripheral device as recited in claim 1, further comprising a switch IO bus providing a point-to-point dedicated interconnection between the printer system and the IO system which permits the transfer of packet-based data directly between the printer system and the IO system.

5. A multifunction peripheral device as recited in claim 1, further comprising a switch IO bus providing a point-to-point dedicated interconnection between the printer system and the processor system which permits the transfer of packet-based data directly between the printer system and the processor system.

6. A multifunction peripheral device as recited in claim 1, further comprising a switch IO bus providing a point-to-point dedicated interconnection between the scanner system and the IO system which permits the transfer of packet-based data directly between the scanner system and the IO system.

7. A multifunction peripheral device as recited in claim 1, further comprising a switch IO bus providing a point-to-point dedicated interconnection between the scanner system and the processor system which permits the transfer of packet-based data directly between the scanner system and the processor system.

8. A multifunction peripheral device as recited in claim 1, further comprising a switch IO bus providing a point-to-point dedicated interconnection between the processor system and the IO system which permits the transfer of packet-based data directly between the processor system and the IO system.

9. A multifunction peripheral device as recited in claim 1, further comprising:
   one or more enhanced IO ports; and,
   a switch IO to PCI bridge which couples the switch fabric to the one or more enhanced IO ports through a switch IO bus providing a point-to-point dedicated interconnection between the switch fabric and the bridge, and through a PCI bus providing an interconnection between the bridge and each one of the one or more enhanced IO ports.

10. A multifunction peripheral device as recited in claim 1, further comprising:

one or more enhanced IO ports; and, a second switch fabric for routing packet-based data between the one or more enhanced IO ports and the switch fabric through switch IO buses, the switch IO buses providing point-to-point dedicated interconnections between each of the one or more enhanced IO ports and the second switch fabric, and between the second switch fabric and the switch fabric.

11. A printer comprising:

a printer system;

an IO system;

a processor system; and, a switch fabric for routing packet-based data between the printer system, the IO system, and the processor system through switch IO buses, the switch IO buses providing a point-to-point dedicated interconnection between the switch fabric and each of the printer system, the IO system, and the processor system.

12. A printer as recited in claim 11, wherein each system is integrated onto a distinct ASIC.

13. A printer as recited in claim 11, further comprising a switch IO bus providing a point-to-point dedicated interconnection between the printer system and the IO system which permits the transfer of packet-based data directly between the printer system and the IO system.

14. A printer as recited in claim 11, further comprising a switch IO bus providing a point-to-point dedicated interconnection between the printer system and the processor system which permits the transfer of packet-based data directly between the printer system and the processor system.

15. A printer as recited in claim 11, further comprising a switch IO bus providing a point-to-point dedicated interconnection between the processor system and the IO system which permits the transfer of packet-based data directly between the processor system and the IO system.

16. A printer as recited in claim 11, further comprising:

one or more enhanced IO ports; and, a switch IO to PCI bridge which couples the one or more enhanced IO ports to the switch fabric, each of the one or more enhanced IO ports coupled to the bridge through a PCI bus, and the bridge coupled to the switch fabric through a point-to-point dedicated switch IO bus.

17. A printer as recited in claim 11, further comprising:

one or more enhanced IO ports; and, a second switch fabric for routing packet-based data between the one or more enhanced IO ports and the switch fabric through switch IO buses, the switch IO buses providing point-to-point dedicated interconnections between each of the one or more enhanced IO ports and the second switch fabric, and between the second switch fabric and the switch fabric.

18. A multifunction peripheral device comprising:

a processor system integrated onto a processor ASIC;

an IO system integrated onto an IO ASIC;

two or more functional systems, each functional system for performing a peripheral function of the multifunction peripheral device, and each functional system integrated onto a distinct ASIC; and, a switch fabric for routing packet-based data between the processor system, the IO system, and each of the functional systems through switch IO buses, the switch IO buses providing point-to-point dedicated interconnection between the switch fabric and the processor system, the switch fabric and the IO system, and the switch fabric and each of the functional systems.

19. A multifunction peripheral device as recited in claim 18, further comprising a switch IO bus providing a point-to-point dedicated interconnection between the processor system and the IO system which permits the transfer of packet-based data directly between the processor system and the IO system.

20. A multifunction peripheral device as recited in claim 18, further comprising a switch IO bus between each of the one or more functional systems providing a point-to-point dedicated interconnection for transferring packet-based data directly between each of the one or more functional systems.

21. A multifunction peripheral device as recited in claim 18, further comprising a switch IO bus between each of the one or more functional systems and the processor system providing a point-to-point dedicated interconnection for transferring packet-based data directly between each of the one or more functional systems and the processor system.

22. A multifunction peripheral device as recited in claim 18, further comprising a switch IO bus between each of the one or more functional systems and the IO system providing a point-to-point dedicated interconnection for transferring packet-based data directly between each of the one or more functional systems and the IO system.

23. A multifunction peripheral device as recited in claim 18, further comprising:

one or more enhanced IO ports; and, a switch IO to PCI bridge which couples the one or more enhanced IO ports to the switch fabric, each of the one or more enhanced IO ports coupled to the bridge through a PCI bus, and the bridge coupled to the switch fabric through a point-to-point dedicated switch IO bus.

24. A multifunction peripheral device as recited in claim 18, further comprising:

one or more enhanced IO ports; and, a second switch fabric for routing packet-based data between the one or more enhanced IO ports and the switch fabric through switch IO buses, the switch IO buses providing point-to-point dedicated interconnections between each of the one or more enhanced IO ports and the second switch fabric, and between the second switch fabric and the switch fabric.

25. A peripheral device comprising:

a processor system integrated onto a processor ASIC;

an IO system integrated onto an IO ASIC;

a peripheral system integrated onto a distinct peripheral ASIC for performing a peripheral function of the peripheral device; and, a switch fabric for routing packet-based data between the processor system, the IO system, and the peripheral system through switch IO buses, the switch IO buses providing point-to-point dedicated interconnection between the switch fabric and the processor system, the switch fabric and the IO system, and the switch fabric and the peripheral system.

26. A peripheral device as recited in claim 25, further comprising a switch IO bus providing a point-to-point dedicated interconnection between the processor system and the IO system which permits the transfer of packet-based data directly between the processor system and the IO system.

27. A peripheral device as recited in claim 25, further comprising a switch IO bus between the peripheral system and the processor system providing a point-to-point dedicated interconnection for transferring packet-based data directly between the peripheral system and the processor system.

28. A peripheral device as recited in claim 25, further comprising a switch IO bus between the peripheral system and the IO system providing a point-to-point dedicated interconnection for transferring packet-based data directly between the peripheral system and the IO system.

29. A peripheral device as recited in claim 25, further comprising:

one or more enhanced IO ports; and, a switch IO to PCI bridge which couples the one or more enhanced IO ports to the switch fabric, each of the one or more enhanced IO ports coupled to the bridge through a PCI bus, and the bridge coupled to the switch fabric through a point-to-point dedicated switch IO bus.

30. A method for transferring packet-based data within the intra-system architecture of a multifunction peripheral device comprising:

transmitting a request packet to a switch fabric from a processor system over a first dedicated switch IO bus;

forwarding the request packet to a printer system over a second dedicated switch IO bus;

generating a response packet at the printer system;

transmitting the response packet to the switch fabric from the printer system over the second dedicated switch IO bus; and, forwarding the response packet to the processor system over the first dedicated switch IO bus.

31. A method as recited in claim 30, further comprising:

acknowledging receipt of any packet by the switch fabric and by any system.

32. A method as recited in claim 30, wherein the request packet is a first request packet and the response packet is a first response packet, the method further comprising:

transmitting a second request packet to the switch fabric from a scanner system over a third dedicated switch IO bus;

forwarding the second request packet to an IO system over a fourth dedicated switch IO bus;

generating a second response packet at the IO system;

transmitting the second response packet to the switch fabric from the IO system over the fourth dedicated switch IO bus; and, forwarding the second response packet to the scanner system over the third dedicated switch IO bus.

33. A method as recited in claim 32, wherein the transmitting and forwarding of the first request packet and the first response packet happens concurrently with the transmitting and forwarding of the second request packet and the second response packet.

\* \* \* \* \*

UNITED STATES PATENT AND TRADEMARK OFFICE
CERTIFICATE OF CORRECTION

PATENT NO. : 6,795,887 B1 Page 1 of 1
DATED : September 21, 2004
INVENTOR(S) : Jose L. Cervantes It is certified that error appears in the above-identified patent and that said Letters Patent is hereby corrected as shown below:

Column 1,
Line 24, delete "(1I)" and insert therefor -- (IO) --

Column 2,
Lines 32 and 67, delete "immerging" and insert therefor -- emerging --

Column 3,
Line 29, delete "10" and insert therefor -- IO --

Column 7,
Line 9, delete "10" and insert therefor -- IO --
Line 33, after "minor" delete -- at --
Line 38, after "minor" delete -- in --

Column 8,
Line 7, after "304" delete -- a --
Line 16,, after "ASIC" delete the comma Column 10,
Line 18, delete "systems" and insert therfor -- system, --
Line 19, delete "trough" and insert therefor -- through --

Signed and Sealed this

Third Day of May, 2005

JON W. DUDAS
*Director of the United States Patent and Trademark Office*